United States Patent [19]

Takahashi et al.

[11] 4,273,748
[45] Jun. 16, 1981

[54] PROCESS FOR REMOVING HARMFUL COMPONENTS FROM GAS

[75] Inventors: Toshihiko Takahashi; Morihisa Maruko; Shoichi Kimura, all of Kudamatsu, Japan

[73] Assignee: Hitachi, Ltd., Tokyo, Japan

[21] Appl. No.: 44,583

[22] Filed: Jun. 1, 1979

Related U.S. Application Data

[63] Continuation-in-part of Ser. No. 771,911, Feb. 25, 1977, abandoned.

[30] Foreign Application Priority Data

Feb. 27, 1976 [JP] Japan .................................. 51-19902
Feb. 27, 1976 [JP] Japan .................................. 51-19931

[51] Int. Cl.³ .............................................. B01D 53/34
[52] U.S. Cl. ..................................... 423/230; 423/231; 423/237; 423/351; 423/409; 423/648 R
[58] Field of Search ............... 423/230, 231, 237, 351, 423/648 R, 409

[56] References Cited

U.S. PATENT DOCUMENTS

| | | |
|---|---|---|
| 1,128,843 | 2/1915 | Bosch et al. .......................... 423/353 |
| 2,551,905 | 5/1951 | Robinson ............................... 423/230 |
| 2,837,398 | 6/1958 | Grosskinsky et al. ................ 423/237 |
| 2,979,384 | 4/1961 | Weiner et al. ........................ 423/231 |
| 3,661,507 | 5/1972 | Breitbach et al. .................... 423/237 |
| 3,773,912 | 11/1973 | Spangler, Jr. ........................ 423/351 |
| 3,974,256 | 8/1976 | Wheelock et al. .................... 423/230 |

OTHER PUBLICATIONS

Jacobson, "Encyclopedia of Chemical Reactions" vol. IV, Reinhold Publishing Co., New York, 1951, p. 103.

*Primary Examiner*—Earl C. Thomas
*Attorney, Agent, or Firm*—Craig & Antonelli

[57] ABSTRACT

A reducing gas, such as a synthetic fuel gas, produced by gasification of a fossil fuel, containing ammonia or both ammonia and hydrogen sulfide, is purified by passing the reducing gas at first, through a first removing agent of iron or nickel system when the hydrogen sulfide is contained, and then through a second removing agent of iron or nickel system, both at elevated temperatures. For example, when the reducing gas contains both ammonia and hydrogen sulfide, the gas is passed through the first removing agent at a temperature of 450°–700° C. to remove substantially all of the hydrogen sulfide and then is passed through the second removing agent at a temperature of greater than 700° C., preferably up to 900° C., to remove substantially all of the ammonia contained in the gas. Not only a remarkable effect upon prevention of environmental pollution but also a great improvement of energy efficiency, as compared with the conventional process, can be obtained.

33 Claims, 8 Drawing Figures

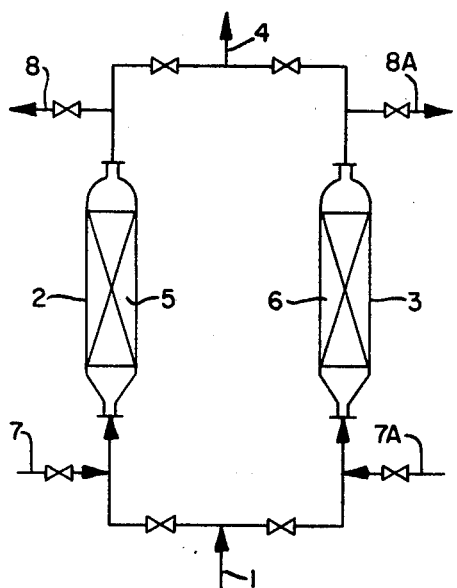
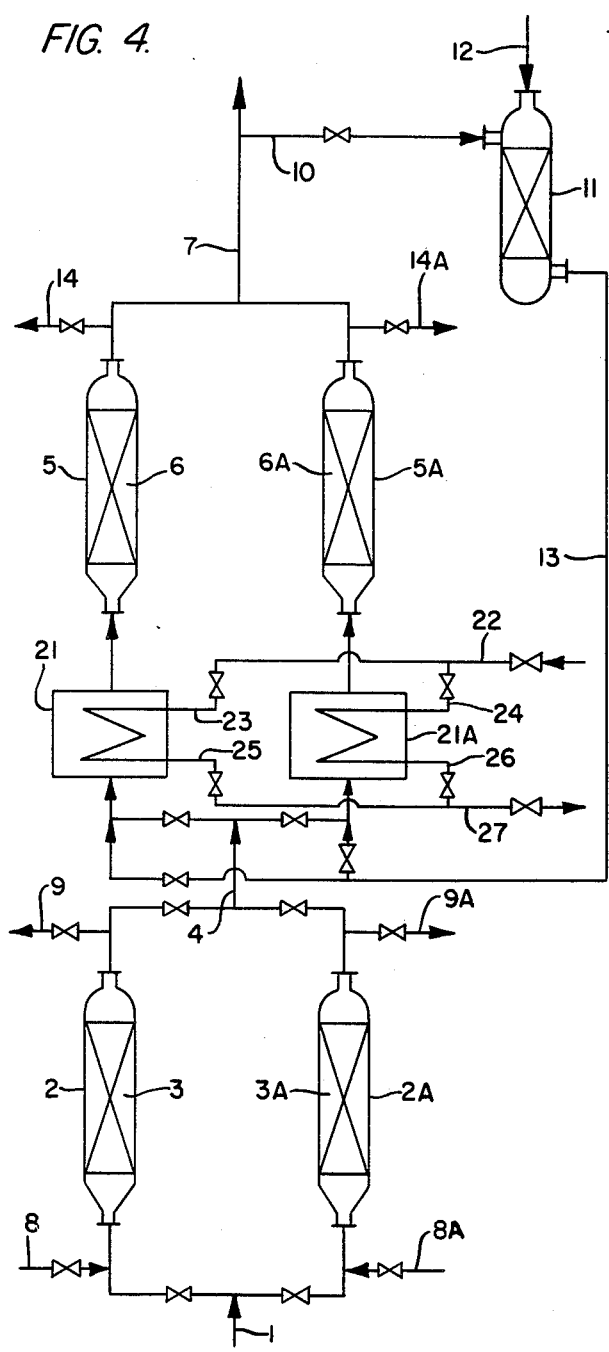
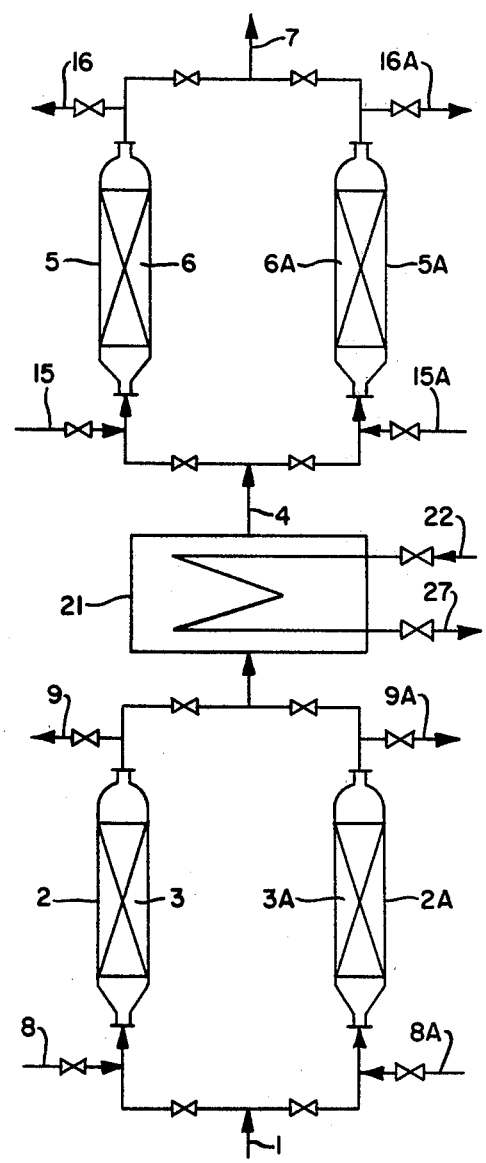
FIG. 3.
FIG. 4.
FIG. 5.

PROCESS FOR REMOVING HARMFUL COMPONENTS FROM GAS

This is a continuation-in-part application of U.S. Ser. No. 771,911, filed Feb. 25, 1977, and now abandoned.

This invention relates to a process for removing harmful components from a reducing gas, especially a synthetic fuel gas, and particularly to a process for removing hydrogen sulfide and ammonia from a reducing gas.

By reducing gas is meant a gas whose constituents, other than the hydrogen sulfide and ammonia, do not react with the hydrogen sulfide and ammonia in the gas, under the conditions set forth infra for removing the hydrogen sulfide and ammonia from the gas. For example, excluded would be constituents which would act to oxidize the hydrogen sulfide under conditions occurring while carrying out the hydrogen sulfide and ammonia removal reactions. An example of a reducing gas as defined herein would be a synthetic fuel gas, formed by gasification of a fossil fuel.

The art of gasifying fossil fuel to synthesize a gaseous fuel such as methane, etc. is well known.

Recently, several attempts have been made to utilize the synthetic fuel of high temperature obtained by such gasification as such from the standpoint of resource saving and energy saving, thereby increasing a heat efficiency. However, the fossil fuel inevitably contains sulfur and nitrogen, which are converted to hydrogen sulfide and ammonia, respectively, at the gasification. Thus, the synthetic fuel contains hydrogen sulfide and ammonia at concentrations of several thousand ppm to several percents.

Hydrogen sulfide is a highly corrosive substance and cannot be discharged into the atmosphere because of environmental pollution. Ammonia produces $NO_x$, known as substances causing a photochemical environmental pollution, when the synthetic fuel gas is combusted, and thus must be removed or decomposed from the synthetic fuel gas before the combustion. However, the removal of these harmful components from the gas is usually difficult, and much more difficult especially at an elevated temperature, to conduct. For example, ammonia is removed by adsorption into an aqueous acid solution at a low temperature according to the conventional art, and the removal of ammonia at an elevated temperature is usually difficult to conduct. Only a process for decomposing ammonia by passing an ammonia-containing gas across a palladium membrane is known as the prior art process for the elevated temperature removal, but the process itself is economically unsuitable for an industrial scale mass treatment on account of the use of expensive palladium membranes.

In the prior art process for removing only hydrogen sulfide at an elevated temperature, for example, calcium carbonate is used, where the following reaction equation (1) is utilized. In the forward reaction, hydrogen sulfide is converted to calcium sulfide, and removed, and in the reverse reaction, calcium carbonate is regenerated and at the same time hydrogen sulfide is recovered. The regenerated calcium carbonate is reutilized as an agent for removing additional hydrogen sulfide.

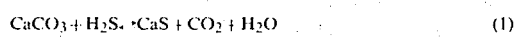

$$CaCO_3 + H_2S \cdot CaS + CO_2 + H_2O \qquad (1)$$

However, the prior art process has the following inevitable disadvantages. Synthetic fuel produced by gasification of fossil fuel usually contains several ten percents of carbon dioxide, which inhibits the dehydrosulfidation reaction, i.e., the forward reaction of the equation (1). The reaction of calcium carbonate with hydrogen sulfide is a kind of surface reaction, and as shells of formed calcium sulfide cover calcium carbonate, the forward reaction of the equation (1) gradually fails to proceed. In other words, calcium carbonate has a lower capacity to remove hydrogen sulfide.

Another disadvantage of the prior art process is that both hydrogen sulfide and ammonia are impossible to remove when the synthetic gas contains these two, though the removal of only hydrogen sulfide is possible to some extent, as described above.

An object of the present invention is to provide a process for effectively removing ammonia, either alone or together with hydrogen sulfide, from a gas at an elevated temperature, which is free from said disadvantages of the prior art processes.

The present invention provides a process for removing ammonia from a reducing gas, especially a synthetic fuel gas, produced by gasification of a fossil fuel, which comprises contacting the gas containing ammonia with an ammonia-removing agent of nickel system or iron system at an elevated temperature.

The present invention further provides a process for removing hydrogen sulfide and ammonia from a reducing gas, such as a synthetic fuel gas, produced by gasification of a fossil fuel, which comprises contacting the gas containing hydrogen sulfide and ammonia with a first removing agent of nickel system or iron system, thereby converting the hydrogen sulfide contained to nickel sulfide or iron sulfide and removing the hydrogen sulfide from the gas, then contacting the gas, having already had the hydrogen sulfide removed, with a second removing agent of nickel system or iron system, thereby removing the ammonia contained from the gas.

The present invention furthermore provides a process for removing hydrogen sulfide and ammonia from a reducing gas, such as a synthetic fuel gas, produced by gasification of a fossil fuel, which comprises contacting the gas containing hydrogen sulfide and ammonia with a first removing agent of nickel system or iron system, thereby converting the hydrogen sulfide contained to nickel sulfide or iron sulfide and removing the hydrogen sulfide from the gas, and then contacting the gas, having had the hydrogen sulfide removed therefrom, with a second removing agent, of nickel system or iron system, thereby removing the ammonia contained from the hot gas, while regenerating the nickel sulfide or iron sulfide resulting from the removal of the hydrogen sulfide by oxidation and reusing the regenerated first removing agent in the removal of additional hydrogen sulfide from the gas, and regenerating nickel nitride or iron nitride resulting from the removal of ammonia by reduction or oxidation and reusing the regenerated second removing agent in the removal of additional ammonia from the gas.

For simplification of description, the present invention will be explained in detail, referring to a case of treating a reducing gas containing both hydrogen sulfide and ammonia. Treatments of gases containing hydrogen sulfide or ammonia individually according to the present invention will be readily comprehensible from the individual removals with a first removing agent or second removing agent in the following case of treating the gas containing these two components.

According to one embodiment of the present invention, a reducing gas, such as a synthetic fuel gas, obtained by gasification of a fossil fuel, containing both hydrogen sulfide and ammonia is contacted, at first, with a first removing agent of nickel system or iron system to convert hydrogen sulfide contained therein to nickel sulfide or iron sulfide, and then contacting the gas, having hydrogen sulfide removed, with a second removing agent of nickel system or iron system to remove ammonia contained therein.

The first removing agent of nickel system includes nickel, nickel-supporting or containing material and nickel oxides such as nickel monoxide (NiO), dinickel trioxide ($Ni_2O_3$), etc., and nickel monoxide is particularly preferably. These nickel and nickel oxides can be used alone or in their mixtures.

The first removing agent of iron system includes iron, iron-supporting or containing material, and iron oxides such as ferrous oxide (FeO), ferric oxide ($Fe_2O_3$), etc., and iron oxides are particularly preferably. These iron and iron oxides are used alone or in their mixtures.

The second removing agent of nickel system includes various nickel compounds such as nickel nitrides ($Ni_xN$) in addition to the removing agents of nickel system enumerated above as examples of the first removing agent. These nickel and nickel compounds are used alone or in their mixtures.

The second removing agent of iron system includes various iron compounds such as iron nitrides ($Fe_xN$) in addition to the removing agents of iron system enumerated above as examples of the first removing agent. These iron and iron compounds are used alone or in their mixtures.

According to the present invention, hydrogen sulfide is removed at first, and then ammonia is removed from the reducing gas when the gas contains both hydrogen sulfide and ammonia. As will be discussed infra, these two components can be effectively removed only in said sequence. In other sequences, for example, in the case of simultaneous treatment or reversed sequence, particularly ammonia removal is not satisfactory.

When NiO is used as the first removing agent, it is seen from analytical studies of the product that the hydrogen sulfide in the gas is converted to nickel sulfide according to reaction equation (2), and thereby removed from the gas.

$$NiO + H_2S \rightarrow NiS + H_2O \qquad (2)$$

Said reaction very rapidly proceeds in a high temperature range, particularly at 400° C. or higher, and continues until NiO is 100% converted to nickel sulfide.

The nickel sulfide obtained according to the equation (2) is readily oxidized through contact with an oxygen source, for example, by calcination, and converted to NiO while forming a sulfur dioxide gas according to the following equation (3):

$$NiS + 3[O] \rightarrow NiO + SO_2 \qquad (3)$$

In a preferable embodiment of the present invention, it is desirable that nickel oxide (NiO) is recovered by regeneration according to the equation (3) and reused in the reaction to remove additional hydrogen sulfide according to the equation (2).

Reactions proceed similarly when iron oxide is used as the first removing agent in place of NiO, and it is preferable to use the first removing agent of iron system and the second removing agent of nickel system in the present invention.

Ammonia contained in a gas totally freed of hydrogen sulfide, or in a gas originally containing no hydrogen sulfide, is satisfactorily removed through contact with the second removing agent at an elevated temperature of 450° C. and higher. However, as will be developed infra, where the gas contains small amounts of hydrogen sulfide, e.g., 200 ppm, the ammonia-containing gas must be contacted with the second removing agent at a temperature of greater than 700° C.

When nickel or NiO is used as the second removing agent, the reactions seem to proceed according to the following equations (4) to (7).

$$2NH_3 \xrightarrow{NiO, Ni} N_2 + 3H_2 \qquad (4)$$

$$NiO + H_2 \rightarrow Ni + H_2O \qquad (5)$$

$$2xNiO + 2NH_3 \rightarrow 2Ni_xN + 3H_2O \qquad (6)$$

$$2xNi + 2NH_3 \rightleftharpoons 2Ni_xN + 3H_2 \qquad (7)$$

Thus, it seems overall that most of the ammonia in the gas is decomposed, and a portion of the ammonia reacts with the second removing agent of the nickel system to form nickel nitride. The amount of nickel nitride increases with reaction time, and ultimately almost all the second removing agent of the nickel system is changed to nickel nitride.

It is known that the nickel nitride promotes the reaction of equation (4) to some extent, but its activity is readily lowered, and thus it is desirable to regenerate the nickel nitride. The regeneration is carried out by either a reduction or oxidation reaction, the reduction reaction utilizing the fact that the equation (7) is a reversible reaction.

First of all, description will be made of the regeneration by reduction. Rates of forward and reversed reaction of the equation (7) depend upon hydrogen gas partial pressure, ammonia gas partial pressure, reaction temperature, and reaction pressure, ans therefore its equilibrium constant is given as a function of these factors. Naturally, the equilibrium is shifted toward the left side of the equation with increasing hydrogen gas partial pressure and reaction pressure, and regeneration to nickel by reduction of nickel nitride can be carried out taking these factors into account.

According to one preferably embodiment of the regeneration by reduction, it is recommended to treat the nickel nitride formed according to the equation (6) or (7) at a high temperature, preferably 450° C. or higher, and a high pressure with a hydrogen-rich reducing gas (usually containing 70 to 80% by volume of hydrogen) obtained by reforming methane and conversion of carbon monoxide through contact of a portion of the hydrogen sulfide and ammonia-free synthetic gas (usually containing 50% or more of methane and carbon monoxide) with steam.

The regenerated nickel thus obtained can be used again as the ammonia-removing agent, and the by-produced ammonia can be recovered, when required.

Regeneration to NiO by oxidation is carried out by contacting nickel nitride with an oxygen source, such as an oxygen-containing gas, for example, air, at a high temperature according to the following equation.

$$Ni_xN + xO_2 \rightarrow xNiO + NO_x \qquad (8)$$

The regenerated nickel oxide thus obtained can be used again as the ammonia-removing agent.

Ammonia can be similarly removed when iron or iron oxides are used as the second removing agent in place of NiO.

Contacting of the reducing gas containing hydrogen sulfide and ammonia with the first removing agent and contacting of the hydrogen sulfide-free gas with the second removing agent can be carried out in any manner. That is, any method available in the relevant technical field, for example, a fixed bed method, a fluidized bed method, a powder-gas stream contact method, or the like, can be used as desired.

Now, the present invention will be described in detail, referring to Examples and Drawings.

In the accompanying drawings,

FIG. 3 is a flow sheet of one embodiment of the present invention, where a gas containing only ammonia as a harmful component is treated according to a fixed bed method.

FIG. 4 is a flow sheet of another embodiment of the present invention, wherein a gas containing both hydrogen sulfide and ammonia as harmful components is treated according to a fixed bed method.

FIG. 5 is a flow sheet of another embodiment of the present invention, wherein a gas containing both hydrogen sulfide and ammonia as harmful components is treated according to a fixed bed method.

Figure 8:
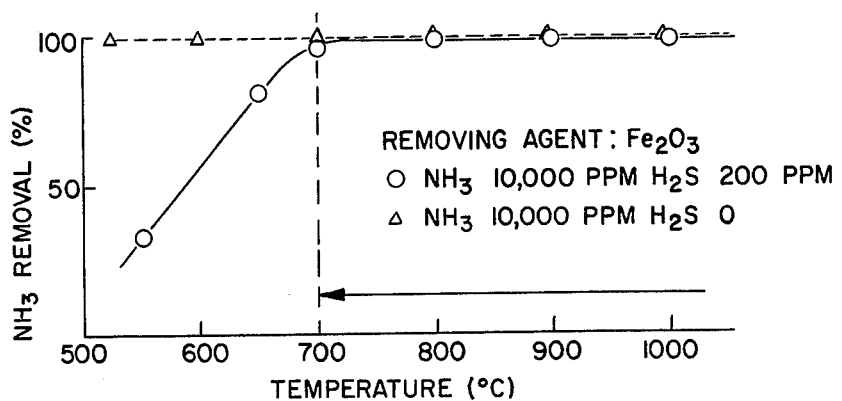

FIG. 8 is a graph showing the extent of removal of ammonia from a gas containing 10,000 ppm ammonia and 200 ppm hydrogen sulfide and a gas containing 10,000 ppm ammonia and no hydrogen sulfide, in a reactor containing $Fe_2O_3$ as the removing agent, as a function of the temperature at which the gases contact the removing agent.

COMPARATIVE EXAMPLE

A test apparatus was set up by providing a preheater coil (inner diameter: 10 mm; total length: 30 m) in a heater furnace, and fixing a U-shaped tube (inner diameter: 10 mm) for filling a removing agent at the downstream end of the preheater coil.

The following tests were carried out without filling the removing agent in the U-shaped tube.

A gas containing 6,500 ppm of ammonia was passed through the apparatus at temperatures and gas velocities given in the following Table 1. As is evident from Table 1, a portion of ammonia in the gas was decomposed, but its percent decomposition was low, for example, 44% at 600° C., and 30% at 800° C.

TABLE I

| Temperature (°C.) | Gas velocity (cm/sec) | $NH_3$ concentration at outlet (ppm) | Percent decomposition (%) |
|---|---|---|---|
| 600 | 100 | 6270 | 4.4 |
|  | 50 | 5167 | 19.26 |
| 700 |  |  |  |
|  | 100 | 5533 | 15.9 |
| 800 | 100 | 4583 | 30.9 |

When the above results are compared with the equilibrium concentration of ammonia at a high temperature and one atmosphere shown in the following Table 2, it is seen that in the present Comparative Example, the contact time is too short at the high temperature owing to the high gas velocity, and consequently ammonia is discharged while being kept at the high concentration even without reaching the equilibrium concentration.

TABLE 2

| Temperature (°C.) | 400 | 600 | 800 |
|---|---|---|---|
| Equilibrium concentration (ppm) | 4400 | 490 | 117 |

EXAMPLE 1

Granules of nickel oxide (NiO) were filled in the U-shaped tube of the apparatus of the Comparative Example, a gas containing 6,500 ppm of ammonia was passed through the apparatus while maintaining the contact time at 0.15 seconds, and percent ammonia removal was obtained. The results are given in FIG. 1, wherein curve A shows the test data at 450° C., and B test data at 500° C. and 700° C. Decomposition of ammonia started at about 200° C., though depending upon differences in the contact time, etc., but at 450° C. the percent ammonia removal was low for the initial small period of gas passage, but thereafter was increased to about 97%, as shown by A in FIG. 1.

Figure 1:
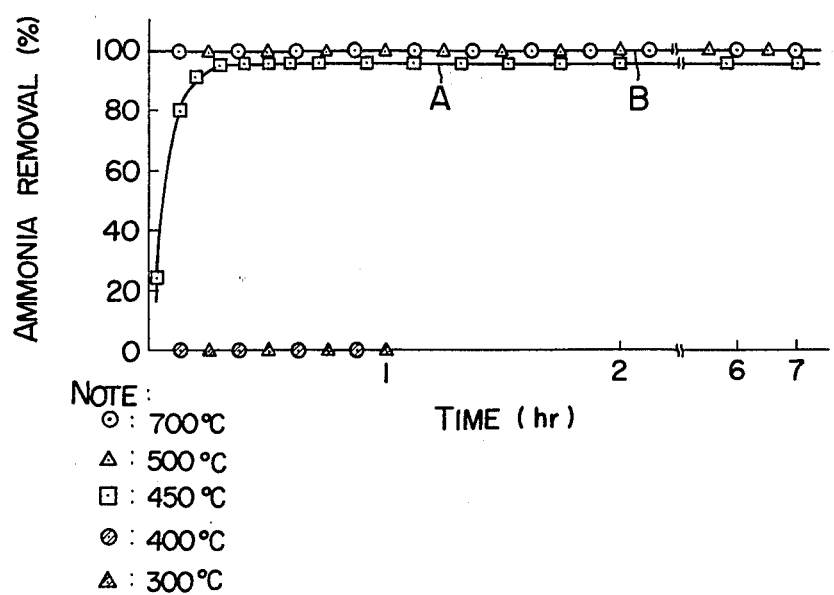
FIG. 1 is a graph showing a capacity of nickel oxide, a removing agent within the scope of the present invention, to remove ammonia.

When the temperature was further increased to, for example, 500° C. and 700° C., no ammonia was observed in the gas at the outlet of the U-shaped tube, and there was no ammonia smell at all in the gas at the outlet, as shown by B in FIG. 1. That is, a percent decomposition as high as 100% was obtained.

Figure 2:
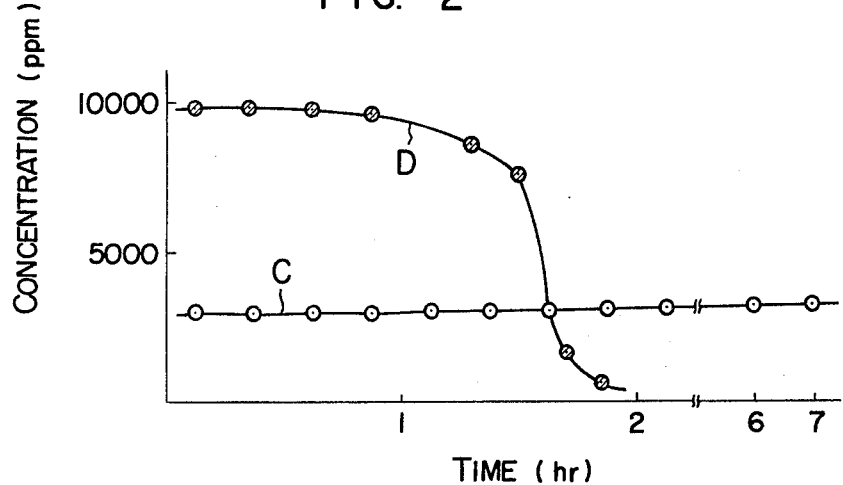
FIG. 2 is a graph showing changes in concentrations of gas components with time when an ammonia-containing gas is treated with nickel oxide, a removing agent within the scope of the present invention, at 700° C.

Then, the gas at the outlet of the U-shaped tube obtained by the treatment of the gas at the contact temperature of 700° C. was subjected to measurements of nitrogen gas and water concentrations, and the results are given in FIG. 2.

As is evident from FIG. 2, nitrogen gas C had a constant value of about 2,800 ppm (about one half of the fed ammonia concentration), whereas the water concentration D was initially about 10,000 ppm (about 1.5 times the fed ammonia concentration) but was abruptly lowered after about 80 minutes.

That C is constant means that the reaction proceeds according to said reaction equation (4) throughout the entire period of reaction. If it is assumed that the fed ammonia is decomposed according to the reaction equation (4), the concentration of formed nitrogen gas should be 3,250 ppm, but actually was 2,800 ppm, as described above. Thus, it is presumed that the difference, 450 ppm, was consumed in the reactions according to the reaction equations (6) and (7).

On the other hand, that the water concentration was abruptly lowered after about 80 minutes from the start of gas passage seems to mean that the reactions according to the reaction equations (5) and (6) ended, and the reaction according to the reaction equation (7) became a main reaction, together with the continuously proceeding reaction according to the reaction equation (4).

Theoretically the reaction according to the reaction equation (7) would be completed after about 5 hours, and thus the reaction would thereafter be a reaction in the absence of nickel or nickel oxide. However, it was made clear that the ammonia decomposition reaction still continued thereafter.

To confirm said fact, the removing agent was taken out of the U-shaped tube at the 7th hour after the start of the reaction to make a chemical analysis of the removing agent. It was found that the removing agent was comprised all of nickel nitrides ($Ni_xN$). This fact shows that nickel nitrides, in addition to nickel or nickel oxide, have a considerable catalytic effect upon the ammonia decomposition.

The activity of the nickel nitrides is, however, readily lowered due to such phenomena as tarry matters, etc., e.g., contained in the synthetic fuel gas, which enter into the pores of the nickel nitrides during the period of continued service, thereby effecting clogging of the pores. In such a case, the nickel nitrides are subjected to regeneration for reuse by oxidation or reduction, using air or hydrogen, whereby $NO_x$ or $NH_3$ is by-produced.

EXAMPLE 2

One embodiment of the present invention is described, referring to FIG. 3, where removal of ammonia from a hot synthetic fuel gas and regeneration of a removing agent are carried out according to a fixed bed method.

A hot synthetic fuel gas 1 containing ammonia at 600° C. (gas composition: 10% $CH_4$, 10% CO, 10% $H_2$, 20% $H_2O$, 15% $CO_2$, 1% $NH_3$ and 34% $N_2$), was fed to a first ammonia removal reactor 2 of fixed bed type at a flow rate of 235 $Nm^3$/hr, and contacted with nickel oxide (NiO) (granule size: 4 mm) 5 filled in the reactor 2 as an ammonia-removing agent. By the contact, most of the ammonia in the gas was decomposed to nitrogen and hydrogen, and a portion of ammonia was fixed as nickel nitrides. The gas was recovered as a purified gas 4 after the removal of ammonia. The purified gas contained not more than 200 ppm of $NH_3$, and the percent ammonia removal was 98% or higher.

When the activity of nickel oxide 5 in the first ammonia removal reactor 2 was lowered, the feeding of the gas 1 containing ammonia was switched to a second reactor 3 from the first reactor 2, and the gas was contacted with nickel oxide (NiO) 6 in the same manner as in the first reactor 2. The gas after the removal of ammonia was recovered as a purified gas 4. The removing agent of lowered activity in the first reactor 2 was regenerated to nickel oxide having an activity by supplying air 7 to the first reactor 2. $NO_x$ 8 by-produced at the regeneration was recovered, if required.

When the activity of nickel oxide 6 in the second reactor was lowered, the feeding of the gas 1 was changed from the second reactor 3 to the first reactor 2 to continue the purification of the gas.

The removing agent 6 of lowered activity in the second reactor 3 was regenerated to nickel oxide having an activity by air 7A in the same manner as in the first reactor 2, and by-produced gas $NO_x$ 8A was recovered, if required.

Removal of ammonia and regeneration of the removing agent were carried out alternately by providing a plurality of ammonia removal reactors, as described above, to remove ammonia from the hot synthetic fuel gas. The ammonia removal from the hot gas and the regeneration of the removing agent could be effectively carried out in the present Example. When the synthetic fuel gas as the purified gas 4 was combusted, no formation of $NO_x$, a substance causing the photo-chemical environmental pollution, was observed at all.

EXAMPLE 3

Another embodiment of the present invention is described, referring to FIG. 4.

In FIG. 4, a hot gas 1 containing both hydrogen sulfide and ammonia, at 600° C. (gas composition: 10% $CH_4$, 10% CO, 10% $H_2$, 20% $H_2O$, 15% $CO_2$, 1% $NH_3$, 0.5% $H_2S$ and 33.5% $N_2$) was, first of all, fed to a desulfurization reactor 2 of fixed bed type at a flow rate of 235 $Nm^3$/hr, and contacted with iron oxide ($Fe_2O_3$) (granule size: 4 mm) as a first removing agent, filled in the first reactor 2. By the contact, hydrogen sulfide in the gas 1 is selectively converted to iron sulfide, which was separated from the gas, whereas almost all of $NH_3$ contained in the gas was passed through the first reactor ($NH_3$ removal: 5–10%). Generally, and as developed infra, a temperature for treating the gas in the first reactor 2 is 450°–700° C. to remove substantially all of the hydrogen sulfide while removing at most 10% by volume of the ammonia.

The gas 1, after the removal of hydrogen sulfide in the first reactor 2, contained 100 to 200 ppm of $H_2S$ (percent sulfur removal: 96–98%). After leaving the first reactor 2, the gas 1 was led through a conduit 4 to heater 21 or 21A, where the gas 1 was heated. It can be appreciated, from FIG. 4, that the heaters 21 and 21A are alternately used. To heat the gas 1, for example, a heating gas from a heating source (not shown in FIG. 4) was led through conduits 22, 23 and 24 to the heater 21 or 21A, and heated the gas coming from the first reactor 2 by heat exchange, and the heating gas itself was cooled thereby and discharged through conduits 25, 26 and 27; however, any known means can be used to heat the gas 1, in heater 21 or 21A, which can sufficiently heat the gas so that it contacts the second removing agent in the first ammonia removal reactor 5, as developed infra, at a temperature above 700° C., preferably up to and including 900° C.

After being heated in one of heaters 21 or 21A, the gas 1 was then fed to a first ammonia removal reactor 5 of fixed bed type, and contacted with nickel oxide (NiO) 6 (granule size: 4 mm) as a second removing agent filled in said first reactor 5. By the contact, most of the ammonia in the gas was decomposed to nitrogen and hydrogen, and a portion of ammonia was converted to nickel nitrides, and removed.

The gas after the ammonia removal had 100 to 200 ppm of $NH_3$, (percent ammonia removal: 98–99%) and recovered as a purified gas 7.

When the effect of the first removing agent upon the removal of hydrogen sulfide was lowered in the first desulfurization reactor 2 of fixed bed type (after about 120 minutes from the start of reaction), the feeding of the hot gas 1 was switched from the first reactor 2 to a second reactor 2A of fixed bed type to contact the gas with fresh iron oxide 3A and convert hydrogen sulfide in the gas 1 to iron sulfide. After the separation of hydrogen sulfide from the gas, the gas was passed through conduit 4 to one of the heaters 21 or 21A. Air 8 was fed at a flow rate of 60 Nm³/hr for one hour to the first reactor 2, having a decreased effect upon the removal of hydrogen sulfide, to regenerate the first removing agent to iron oxide. Sulfur dioxide gas 9 by-produced in the regeneration was recovered, if required.

When the activity of the first removing agent 3A in the second reactor 2A was lowered, the feeding of the hot gas 1 was switched to the first reactor 2 filled with the iron oxide 3 having a regenerated effect upon the removal of hydrogen sulfide. The regeneration of the second reactor 2A was carried out by feeding air 8A to the second reactor 2A in the same manner as in the regeneration of the first reactor 2, and sulfur dioxide gas 9A by-produced in the regeneration was recovered, if required.

In this manner, desulfurization and regeneration were carried out alternately by using a plurality of desulfurization reactors of fixed bed type, and the gas was fed to the heater and then to the ammonia removal reactor of fixed bed type after the removal of hydrogen sulfide from the hot gas.

On the other hand, when the effect of ammonia removal was lowered in the first ammonia removal reactor 5 of fixed bed type, the feeding of the hot gas 4 was switched to a second ammonia removal reactor 5A of fixed bed type, and the gas 1 was contacted was nickel oxide (NiO) 6A in the second reactor 5A. For example, as can be seen in FIG. 4, the gas 1 leaving the first reactor 2 is switched such that it passed through heater 21A and then through second ammonia removal reactor 5A. The gas free from ammonia was recovered as a purified gas 7. A portion 10 of the purified gas 7 was fed to a reforming furnace, where reforming of methane contained and conversion of carbon monoxide contained were carried out by feeding steam 12 to the furnace 11.

Reducing gas 13 rich in hydrogen thus obtained was fed at a flow rate of 10 Nm³/hr to the ammonia removal reactor 5 of fixed bed type having the lowered effect upon the ammonia removal, and contacted with the removing agent 6 having the lowered effect upon the ammonia removal. For example, as can be seen in FIG. 4, this reducing gas 13 is passed through heater 21 and then to the first ammonia removal reactor 5. By the contact the removing agent was regenerated to nickel while by-producing ammonia. A gas 14 containing the by-produced ammonia was recovered, if required.

When the effect upon the ammonia removal of the second ammonia removal reactor of fixed bed type 5A was lowered, the hot gas 4 was fed to the first reactor 5, and contacted with the regenerated removing agent to remove ammonia from the hot gas. The second reactor 5A having the lowered effect upon the ammonia removal was regenerated by the reducing gas 13 in the same manner as in the first reactor 5, and a gas 14A containing ammonia by-produced in the regeneration was recovered, if required.

The ammonia removal and reductive regeneration were carried out alternately by using a plurality of ammonia removal reactors of fixed bed type in this manner, and ammonia was removed from the hot gas thereby.

The hot gas containing both hydrogen sulfide and ammonia was purified by using iron oxide as the first removing agent, and nickel oxide as the second removing agent. In the present Example, the first removing agent was iron oxide, and the second removing agent was nickel oxide, but nickel oxide and iron oxide can be similarly used as the first and second removing agents, respectively.

To be especially noted with respect to this Example 3 is that the hydrogen sulfide is removed in the first reactor 2 or 2A, where the gas 1 contacts the first removing agent at a temperature of between 450°–700° C., with at most 10% removal of ammonia, and then the ammonia is removed in the second reactor, ammonia removal reactor 5 or 5A, after the gas has left the first set of reactors 2 or 2A and has been heated such that it contacts the ammonia removal reactor at a temperature greater than 700° C.

Figure 6:
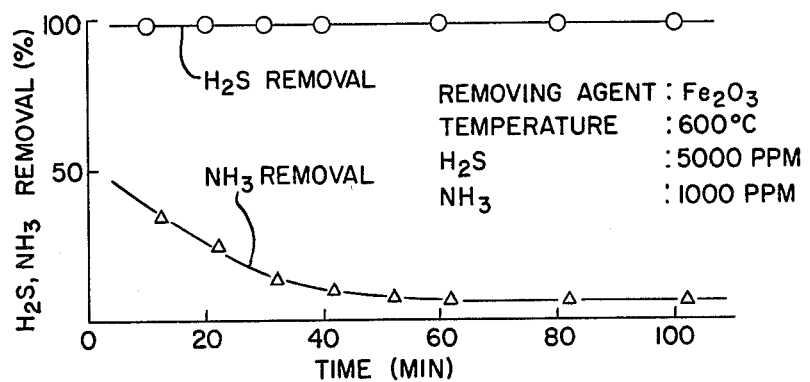
FIG. 6 is a graph showing the extent of removal of $H_2S$ and $NH_3$, from a gas containing 5000 ppm hydrogen sulfide and 10,000 ppm ammonia, in a single reactor containing $Fe_2O_3$ as the removing agent, wherein the gas contacts the $Fe_2O_3$ at a temperature of 600° C.

That the hydrogen sulfide must be removed prior to removal of the ammonia can be seen in considering FIG. 6. As can be seen in FIG. 6, where the gas to be treated contains 5000 ppm hydrogen sulfide and 1000 ppm ammonia, it is very difficult to remove the ammonia in a single reactor, and at treatment temperatures of 600° C., using $Fe_2O_3$ as the removing agent, after a short period of time, most of the ammonia is passed through the reactor. FIG. 6 shows that the ability of the removing agent to remove ammonia from a gas containing 5000 ppm hydrogen sulfur decreases greatly in a short period of time. This can be explained by noting that the hydrogen sulfide removal is effected through a chemical reaction with the removing agent, whereby, for example, the metal oxide is converted to a sulfide, whereas the ammonia removal takes place through decomposition mainly due to the catalytic action of the removing agent. It is also noted that this chemical reaction proceeds much faster than the decomposition. Moreover, it is noted that the hydrogen sulfide which does not react with the removing agent is a catalyst poison against the ammonia decomposition, thereby preventing this decomposition. From the foregoing, it can be seen that the presence of the hydrogen sulfide in the gas to be treated deleteriously affects the decomposition of the ammonia.

It has been found that by controlling the temperature of contact of the gas with the first removing agent and the second removing agent, the hydrogen sulfide can be substantially fully removed in contacting the first removing agent and then the ammonia can be removed in contacting the second removing agent. This can be seen in considering FIGS. 7-8. Thus, FIG. 7 shows that, in a gas containing 5000 ppm hydrogen sulfide and 1% by volume ammonia, which gas is treated by contacting a $Fe_2O_3$ removing agent, the hydrogen sulfide can be effectively and substantially removed when the gas contacts the removing agent at a temperature between 450°–700° C.

Figure 7:
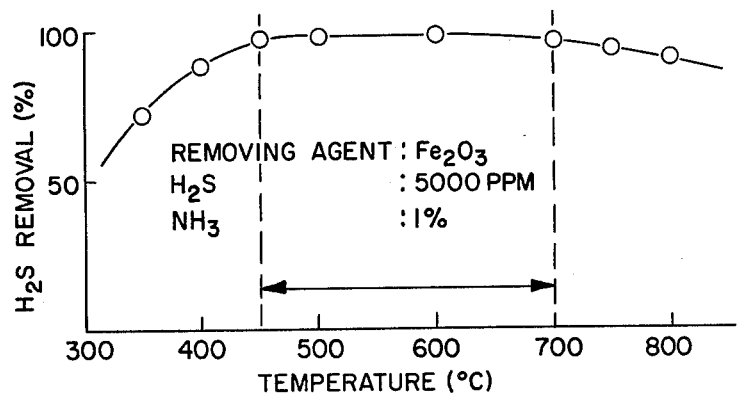
FIG. 7 is a graph showing the extent of removal of hydrogen sulfide from a gas containing 5,000 ppm hydrogen sulfide and 1% by volume ammonia, in a reactor containing $Fe_2O_3$ as the removing agent, as a function of the temperature at which the gas contacts the removing agent.

However, as seen in FIG. 7 and the results of Example 3 herein, the hydrogen sulfide is not totally removed when contacting the first removing agent. Thus, in Example 3, 100 to 200 ppm of hydrogen sulfide remained in the gas after treatment in the first reactor 2. As can be seen in FIG. 8, ammonia can be effectively removed from a gas containing 10,000 ppm ammonia and no hydrogen sulfide at temperatures above 500° C.; whereas, if the gas contains 200 ppm hydrogen sulfide, ammonia cannot be effectively removed at a temperature of 500°–700° C. However, even if the gas contains 200 ppm hydrogen sulfide, the ammonia can be removed from the gas by elevating the treatment temperature to a temperature greater than 700° C., as is clear in FIG. 8.

Thus, a substantial amount of the hydrogen sulfide can be removed in the first reactor 2, using a treatment temperature of 450°-700° C.; but even if a minor amount of hydrogen sulfide remains after treatment in the first reactor 2 and is passed into the ammonia removal reactor 5, the ammonia can be effectively removed in this reactor 5 if the treating temperature is greater than 700° C. In practice, since high treatment temperature require large amounts of fuel to heat the gas to be treated, in heater 21 or 21A, to the treatment temperature, prior to introduction to the ammonia removal reactor 5 or 5A, the preferred treatment temperature is greater than 700° C. and up to and including 900° C.

EXAMPLE 4

Further embodiment of the present invention is described, referring to FIG. 5, where nickel nitrides formed in the ammonia removal reactors 5 and 5A were regenerated to nickel oxide by oxidation using air 15 and 15A, respectively. It is noted that elements common to both FIGS. 4 and 5 are referenced by the same number. Regeneration was carried out in the similar manner as in FIG. 4, except that the gas by-produced in the regeneration was $NO_x$ 16 and 16A, and the removing agents 6 and 6A were regenerated to the oxide. Air used for the regeneration was fed at a flow rate of 60 $Nm^3/hr$.

It is noted that in this embodiment, only a single heater 21 was used to heat the gas which has already passed through the first reactor 2 or 2A. From this heater 21, the gas is alternately passed through ammonia removal reactors 5 and 5A.

As is clear from the foregoing description, ammonia which has been deemed impossible to eliminate, or together with hydrogen sulfide can be effectively removed from a reducing gas, and thus not only a remarkable effect upon prevention of environmental pollution, but also a great improvement of energy efficiency, as compared with the conventional processes, can be obtained, for example, when the reducing gas is a synthetic fuel gas produced from fossil fuel.

We claim:

1. A process for removing hydrogen sulfide and ammonia from a reducing gas containing hydrogen sulfide and ammonia, which comprises contacting said reducing gas containing hydrogen sulfide and ammonia with a first removing agent at a temperature in the range of 450°-700° C., said first removing agent including at least one of nickel and nickel oxides or at least one of iron and iron oxides and being capable of converting hydrogen sulfide in the reducing gas to nickel sulfide or iron sulfide but being substantially incapable of decomposing ammonia at a temperature in the range of 450°-700° C., thereby converting hydrogen sulfide contained to nickel sulfide or iron sulfide and removing hydrogen sulfide from the gas, and removing less than 10% of the ammonia from the reducing gas, then contacting the reducing gas with a second removing agent at a temperature greater than 700° C., said second removing agent including at least one of nickel and oxides and nitrides of nickel or at least one of iron and oxides and nitrides of iron and being capable of decomposing ammonia at a temperature greater than 700° C., thereby decomposing ammonia and removing ammonia contained from the reducing gas.

2. A process according to claim 1, wherein the first removing agent includes at least one of nickel, nickel oxide, and dinickel trioxide, or at least one of iron, ferrous oxide, and ferric oxide, and the second removing agent includes at least one of nickel, nickel monoxide, dinickel trioxide, and nickel nitride, or at least one of iron, ferrous oxide, ferric oxide, and iron nitride.

3. A process according to claim 1, wherein said reducing gas is a synthetic fuel gas produced by gasification of a fossil fuel.

4. A process according to claim 1, wherein the reducing gas is contacted with said second removing agent at a temperature greater than 700° C. and up to and including 900° C.

5. A process according to claim 1, wherein, in removing said ammonia, the at least one of nickel and iron and oxides of nickel and oxides of iron is converted to nickel nitride or iron nitride, respectively.

6. A process for removing hydrogen sulfide and ammonia from a reducing gas containing hydrogen sulfide and ammonia, which comprises contacting said reducing gas containing hydrogen sulfide and ammonia with a first removing agent at a temperature in the range of 450°-700° C., said first removing agent including at least one of nickel and oxides of nickel or at least one of iron and oxides of iron and being capable of converting hydrogen sulfide contained in the reducing gas to nickel sulfide or iron sulfide but being substantially incapable of decomposing ammonia at a temperature in the range of 450°-700° C, thereby converting hydrogen sulfide contained to nickel sulfide or iron sulfide and removing hydrogen sulfide from the reducing gas, and removing less than 10% of the ammonia from the reducing gas, and then contacting the reducing gas with a second removing agent at a temperature greater than 700° C., said second removing agent including at least one of nickel and oxides and nitrides of nickel or at least one of iron and oxides and nitrides of iron and being capable of decomposing ammonia at a temperature greater than 700° C., thereby decomposing ammonia in the reducing gas and removing ammonia contained from the reducing gas, converting said ammonia to nickel nitride or iron nitride, regenerating the nickel sulfide or iron sulfide resulting from the removal of the hydrogen sulfide by oxidation and reusing the regenerated first removing agent in the removal of hydrogen sulfide from the reducing gas, and regenerating nickel nitride or iron nitride resulting from the removal of ammonia and reusing the regenerated second removing agent in the removal of ammonia from the reducing gas.

7. A process according to claim 6, wherein nickel nitride or iron nitride is regenerated by oxidation of said nickel nitride or iron nitride.

8. A process according to claim 6, wherein nickel nitride or iron nitride is regenerated by reduction of said nickel nitride or iron nitride.

9. A process according to claim 6, wherein the reducing gas is contacted with the second removing agent at a temperature greater than 700° C. and up to and including 900° C.

10. A process according to claim 6, wherein the reducing gas is a synthetic fuel gas produced by gasification of a fossil fuel.

11. A process for removing hydrogen sulfide and ammonia from a hot synthetic fuel gas synthesized by gasification of a fossil fuel, comprising the steps of:

(a) contacting a hot synthetic fuel gas containing hydrogen sulfide and ammonia with a first removing agent including at least one of nickel, nickel monoxide and dinickel trioxide, or at least one of iron, ferrous oxide and ferric oxide, at a temperature in the range of 450°–700° C., said first removing agent being capable of converting the hydrogen sulfide contained in the reducing gas to nickel sulfide or iron sulfide but being substantially incapable of decomposing ammonia at a temperature in the range of 450°–700° C., thereby converting hydrogen sulfide contained to nickel sulfide or iron sulfide, respectively, removing hydrogen sulfide from the fuel gas, and removing less than 10% of the ammonia from the fuel gas;

(b) contacting the hot synthetic fuel gas of step (a) with a second removing agent including at least one of nickel, nickel monoxide, dinickel trioxide, and nickel nitride, or at least one of iron, ferrous oxide, ferric oxide and iron nitride, at a temperature greater than 700° C., said second removing agent being capable of decomposing ammonia at temperatures greater than 700° C., thereby decomposing the ammonia contained in the fuel gas and removing the ammonia from the hot synthetic fuel gas, whereby at least a part of said second removing agent, after said decomposing, is nickel nitride or iron nitride; and (c) regenerating the nickel sulfide or iron sulfide of step (a) by oxidation and recycling the resulting nickel oxide or iron oxide for reuse according to step (a); and (d) regenerating nickel nitride or iron nitride resulting from step (b) to the second removing agent and recycling the regenerated second removing agent for reuse in step (b).

12. A process according to claim 11, wherein the first removing agent of step (a) is at least one of iron, ferrous oxide or ferric oxide.

13. A process according to claim 12, wherein the first removing agent is ferrous oxide or ferric oxide.

14. A process according to claim 11, wherein the second removing agent of step (b) is at least one of nickel, nickel monoxide, dinickel trioxide, and nickel nitride.

15. A process according to claim 14, wherein the second removing agent is at least one of nickel, nickel oxide and nickel nitride.

16. A process according to claim 14, wherein the nickel nitride resulting from step (b) is regenerated by reducing the nickel nitride by contacting the nickel nitride with a hydrogen-rich reducing gas at a temperature of at least 450° C. and a high pressure.

17. A process according to claim 16, wherein the hydrogen-rich reducing gas is formed by contacting a portion of the hydrogen sulfide-free and ammonia-free synthetic fuel gas with steam, thereby reforming methane and converting carbon monoxide fractions of the synthetic fuel gas, whereby a hydrogen-rich reducing gas is obtained.

18. A process according to claim 14, wherein the nickel nitride resulting from step (b) is regenerated by oxidizing the nickel nitride in an oxygen-containing gas at a high temperature.

19. A process according to claim 18, wherein the oxygen-containing gas is air.

20. A process according to claim 11, wherein the regeneration of nickel nitride according to step (d) is by oxidation of nickel nitride to nickel oxide.

21. A process according to claim 11, wherein the regeneration of nickel nitride according to step (d) is by reduction of nickel nitride to nickel.

22. A process according to claim 11, wherein the hot synthetic fuel gas of step (a) is contacted with said second removing agent at a temperature greater than 700° C. and up to and including 900° C.

23. A process for removing hydrogen sulfide and ammonia from a hot synthetic fuel gas synthesized by gasification of a fossil fuel, comprising the steps of:

(a) feeding a hot synthetic fuel gas containing hydrogen sulfide and ammonia so that said fuel gas contacts a first removing agent including at least one of nickel, nickel monoxide and dinickel trioxide, or at least one of iron, ferrous oxide and ferric oxide, at a temperature in the range of 450°–700° C., said first removing agent being capable of converting the hydrogen sulfide contained in the reducing gas to nickel sulfide or iron sulfide but being substantially incapable of decomposing ammonia at a temperature in the range of 450°–700° C., thereby converting hydrogen sulfide contained to nickel sulfide or iron sulfide, respectively, removing hydrogen sulfide from the fuel gas, and removing less than 10% of the ammonia from the fuel gas;

(b) when the conversion of hydrogen sulfide is decreased when contacting said first removing agent, switching the feed of said hot synthetic fuel gas containing hydrogen sulfide and ammonia so that the fuel gas contacts another first removing agent including at least one of nickel, nickel monoxide and dinickel trioxide, or at least one of iron, ferrous oxide and ferric oxide, at a temperature in the range of 450° C.–700° C., said another first removing agent being capable of converting the hydrogen sulfide contained in the reducing gas to nickel sulfide or iron sulfide but being substantially incapable of decomposing ammonia at a temperature in the range of 450°–700° C., thereby converting hydrogen sulfide contained to nickel sulfide or iron sulfide, respectively, removing hydrogen sulfide from the fuel gas, and removing less than 10% of the ammonia from the fuel gas;

(c) while the hot synthetic fuel gas contacts said another first removing agent, regenerating the nickel sulfide or iron sulfide resulting in step (a) by oxidizing said nickel sulfide or iron sulfide;

(d) when the conversion of hydrogen sulfide is decreased when contacting said another first removing agent, switching the feed of said hot synthetic fuel gas containing hydrogen sulfide and ammonia so that said hot synthetic fuel gas contacts said first removing agent;

(e) while the hot synthetic fuel gas contacts said first removing agent, regenerating the nickel sulfide or iron sulfide resulting from step (b) by oxidizing said nickel sulfide or iron sulfide;

(f) feeding the hot synthetic fuel gas which has contacted said first or said another first removing agent so that the fuel gas contacts a second removing agent including at least one of nickel, nickel monoxide, dinickel trioxide, and nickel nitride, or at least one of iron, ferrous oxide, ferric oxide and iron nitride, at a temperature greater than 700° C., said second removing agent being capable of decomposing ammonia at temperatures greater than 700° C., thereby decomposing ammonia contained in the fuel gas and removing ammonia contained from the hot synthetic fuel gas, whereby at least a part of said second removing agent, after the decomposing, is nickel nitride or iron nitride;

(g) when the removal of ammonia when contacting said second removing agent is decreased, switching the feed of the fuel gas so that the fuel gas contacts another second removing agent including at least one of nickel, nickel monoxide, dinickel trioxide, and nickel nitride, or at least one of iron, ferrous oxide, ferric oxide and iron nitride, at a temperature greater than 700° C., said another second removing agent being capable of decomposing ammonia at temperatures greater than 700° C., thereby continuing to decompose ammonia contained in the fuel gas and remove ammonia contained from the hot fuel gas, whereby at least a part of said another second removing agent, after the decomposing, is nickel nitride or iron nitride;

(h) while the hot fuel gas contacts said another second removing agent, regenerating said second removing agent;

(i) when the removal of ammonia when contacting said another second removing agent is decreased, switching the feed of the fuel gas so that the fuel gas contacts said second removing agent; and (j) while the fuel gas contacts said second removing agent, regenerating said another second removing agent.

24. A process according to claim 23, wherein said second and said another second removing agents are regenerated by reducing nickel nitride or iron nitride resulting after contact of said second and said another second removing agents with the fuel gas by contacting the nickel nitride or iron nitride with a hydrogen-rich reducing gas at a temperature of at least 450° C. and a high pressure.

25. A process according to claim 24, wherein said hydrogen-rich reducing gas is formed by contacting a portion of the synthetic fuel gas, after removal of hydrogen sulfide and ammonia, with steam, thereby reforming methane and converting carbon monoxide fractions of the synthetic fuel gas, whereby a hydrogen-rich reducing gas is obtained.

26. A process according to claim 23, wherein said second and said another second removing agents are regenerated by oxidizing nickel nitride or iron nitride resulting after contact of said second and said another second removing agent with said fuel gas by contacting the nickel nitride or iron nitride with an oxygen-containing gas at a high temperature.

27. A process according to claim 23, wherein, before feeding the hot synthetic fuel gas which has contacted said first or said another first removing agent so that it contacts the second or another second removing agent, the hot synthetic fuel gas is passed through heating means, whereby it is heated to a temperature so that it contacts the second or another second removing agent at a temperature greater than 700° C.

28. A process according to claim 23, wherein the hot synthetic fuel gas contacts said second or said another second removing agent at a temperature greater than 700° C. and up to and including 900° C.

29. A process according to any one of claims 1, 6, 11 or 23, wherein said first removing agent includes nickel or iron, and wherein said nickel or iron is formed on a support.

30. A process according to claim 29, wherein said second removing agent includes nickel or iron, and wherein said nickel or iron is formed on a support.

31. A process according to any one of claims 1, 6, 11 or 23, wherein said second removing agent includes nickel or iron, and wherein said nickel or iron is formed on a support.

32. A process according to claim 23, wherein said first and another first removing agents include nickel or iron, and wherein said nickel or iron is formed on a support.

33. A process according to claim 23 or 32, wherein said second and another second removing agents include nickel or iron, and wherein said nickel or iron is formed on a support.

* * * * *